United States Patent [19]

Colegrove

[11] Patent Number: 4,764,222
[45] Date of Patent: Aug. 16, 1988

[54] N-METHYL-2-PYRROLIDONE COMPOSITIONS

[75] Inventor: George T. Colegrove, San Diego, Calif.

[73] Assignee: Merck & Co. Inc., Rahway, N.J.

[21] Appl. No.: 37,655

[22] Filed: Apr. 13, 1987

[51] Int. Cl.⁴ .................................................. C11D 7/50
[52] U.S. Cl. .......................................... 134/38; 134/2; 134/3; 134/26; 134/41; 252/DIG. 8; 252/542
[58] Field of Search ...................... 134/38, 2, 3, 26, 41; 252/DIG. 8, 542

[56] References Cited

U.S. PATENT DOCUMENTS 4,085,059  4/1978  Smith et al. ................... 252/DIG. 8
4,276,186  6/1981  Bakos et al. ............................ 134/38
4,401,760  8/1983  Polk et al. ............................ 435/101
4,428,871  1/1984  Ward et al. ............................ 134/38

FOREIGN PATENT DOCUMENTS 0132332  8/1986  European Pat. Off. ............ 435/101

OTHER PUBLICATIONS

Kirk-Othmer, "Encyclopedia of Chemical Technology", vol. 12, (1980), pp. 45-65.

*Primary Examiner*—Asok Pal
*Attorney, Agent, or Firm*—Gabriel Lopez; Hesna J. Pfeiffer

[57] ABSTRACT

Viscous solutions of NMP are described which comprise up to about 90% NMP. The viscosifying agent is rhamsan gum.

1 Claim, No Drawings

N-METHYL-2-PYRROLIDONE COMPOSITIONS

BACKGROUND OF THE INVENTION

N-methyl-2-pyrrolidone (NMP) is a commercially available (e.g., from BASF Wyandotte or GAF) solvent used industrially for cleaning, production of electronic circuiting, etc. A recent application of this solvent is as a paint stripper, i.e. a remover of dried coats of paint from surfaces. Although methylene chloride is widely used for this purpose, its high volatility and suspected carcinogenicity has led to a search for an alternative product.

A disadvantage of NMP is its low viscosity and low adhesive properites. This is particularly problematical when the NMP is applied to a vertical surface since it will flow off the surface before penetration, especially if the surface has multiple coats of dried paint.

SUMMARY OF THE INVENTION

It has now been found that rhamsan gum is soluble in NMP/water systems containing up to 90% NMP.

DETAILED DESCRIPTION

The compositions of this invention comprise 0.25-2% S-194, 40-85% NMP, and water to 100%, all by weight. Optionally, these compositions can also comprise 0.5 to 2% ethoxylated non-ionic surfactant. Other additives commonly used in the preparation of paint strippers are also within the scope of these compositions. However, additives such as paraffin wax, which is used to retard solvent evaporation, activators such as amines, and cationic or anionic surfactants used to promote removal by water are, advantageously, unnecessary since the compositions of this invention are not highly volatile and are readily removed with water.

Another embodiment of this invention is a composition which comprises 0.25-2% S-194, 40-90% NMP, 0.5 to 2% ethoxylated non-ionic surfactant, and water to 100%, all by weight.

By the term "S-194": (also known as rhamsan gum) is meant the extracellularly produced gum made by the heteropolysaccharide-producing bacterium of the genus Alcaligenes, ATCC 31961, by the whole culture fermentation under a variety of conditions of a medium comprising: a fermentable carbohydrate, a nitrogen source, and other appropriate nutrients. Processes for producing S-194 are described in U.S. Pat. No. 4,401,760 and EP No. 192,332 (Aug. 27, 1986), both of which are incorporated herein by reference.

Another embodiment of this invention is a process for removing dried paint from a painted surface which comprises applying to such surface a composition of this invention (i.e., compositions containing 40-85% NMP or up to 90% NMP when 0.5 to 2% ethoxylated non-ionic surfactant is used), waiting for the paint to soften, and then removing the softened paint from the surface.

Commercially available surfactants within the scope of this invention include but are not limited to Triton X-100 (ethoxylated octylphenol, Rhom and Haas), Plurunic F88 (polyoxyethylenepolyoxypropylene block polymer, BASF Wyandotte), and Tetronic 1107 (high-molecular weight polyether block polymer, BASF Wyandotte).

The compositions of this invention are prepared by dissolving the rhamsan gum in water followed by NMP addition, or by dispersal of the gum in NMP followed by addition of water and dissolution of the gum. When a surfactant is used, it is preferably added after the gum/NMP/water composition is prepared.

The use of S-194 advantageously provides to NMP solutions high viscosity at low shear rates at low gum concentrations.

The cellulose derivatives hydroxypropyl cellulose (HPC) and methylhydroxypropyl cellulose (MHPC) are used to viscosify $CH_2Cl_2$ based paint strippers. These thickeners are also soluble in NMP but the resulting products are much lower in viscosity than rhamsan-thickened NMP and are much less effective in adhering to vertical surfaces.

EXAMPLE 1

Rhamsan Vs. Cellulose Viscosities

NMP compositions were prepared and their viscosities measured on a Brookfield LVT viscometer, 6 rpm, spindle 3. The following data were obtained.

| Gum | NMP (%) | Water (%) | Viscosity (cP) |
| --- | --- | --- | --- |
| 0.5% rham. | 75 | 24.5 | 3800 |
| 1.0% HPC (Klucel) | 99 | — | 1900 |
| 1.0% MHPC (Methocel K14M) | 99 | — | 350 |

Solutions of the above were brushed onto a plywood panel having a dried paint film on the surface. The solution containing rhamsan gum exhibited better cling to the surface when inclined in a vertical position. All solutions lifted the paint film which could be removed by scraping or flushing with water.

In other tests wherein the NMP level was varied from 40% to 85% by weight addition of rhamsan gum permitted excellent cling to vertical surfaces and aided in the removal of various types of water- and solvent-based paints, the rate of removal or softening of the paint film depending on the concentraiton of NMP in the composition (the higher the level, the faster the softening).

What is claimed is:

1. A process for removing dried paint from a surface which comprises applying to said surface an effective amount of a composition comprising by weight 0.25-2% rhamsan gum, 40-90% N-methyl-2-pyrrolidone, 0.5 to 2% ethoxylated non-ionic surfactant, and water to 100%, allowing said dried paint to soften, and then removing said softened paint from said surface.

* * * * *